Jan. 12, 1937.  T. H. JACOB  2,067,451
COMBINED HITCH AND BRAKING DEVICE FOR TRAILERS
Filed Feb. 20, 1935  3 Sheets-Sheet 1
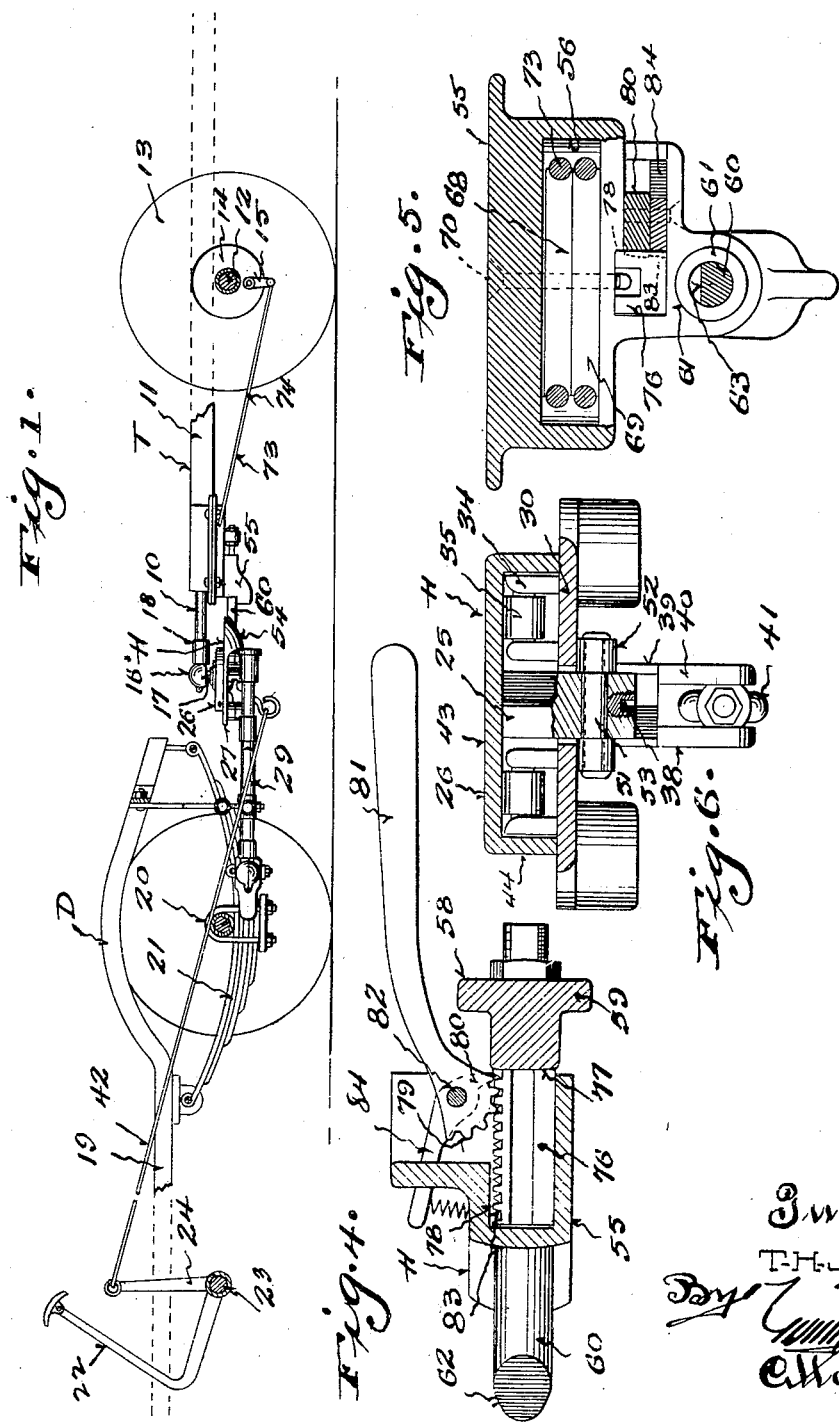

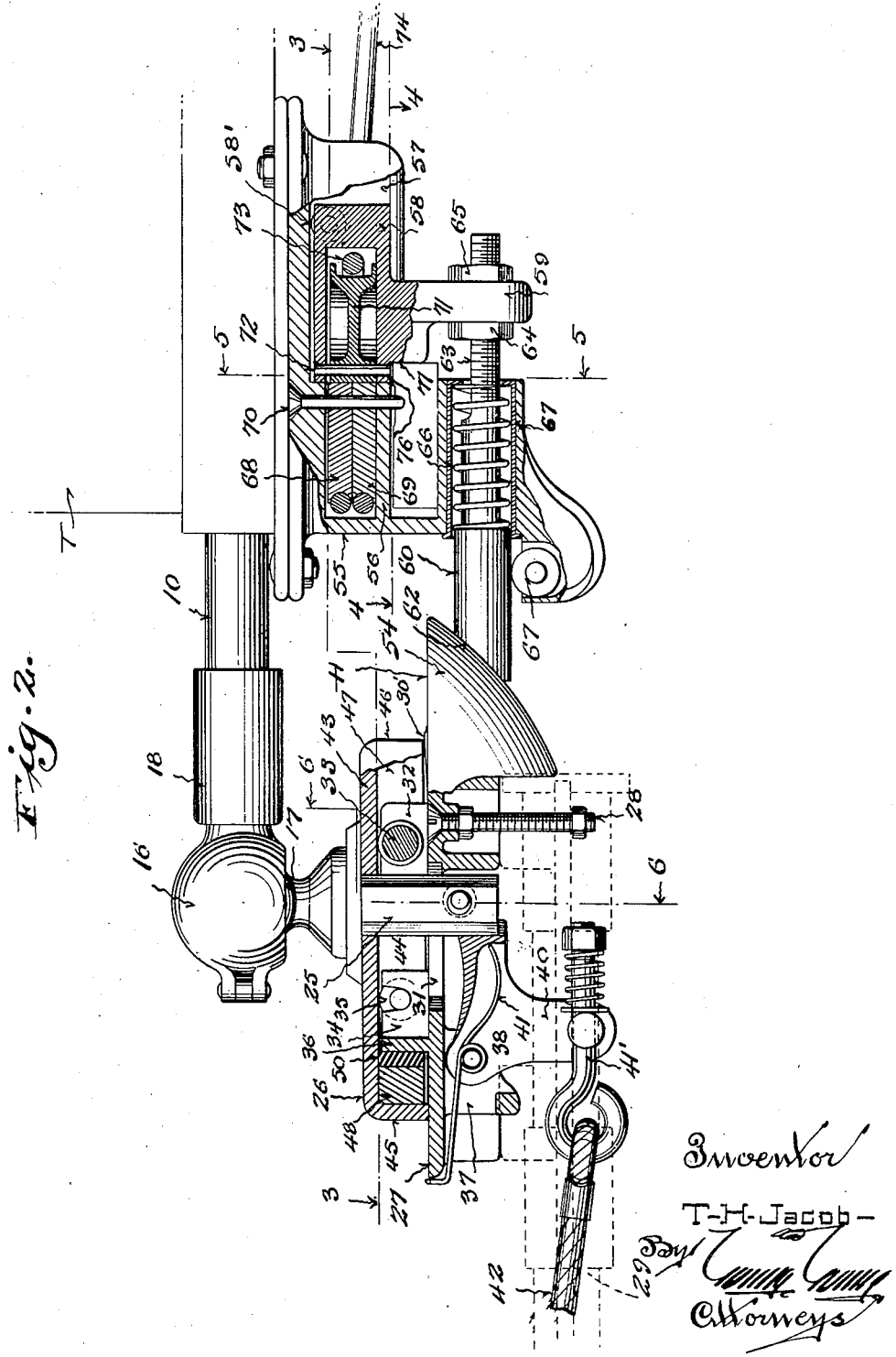

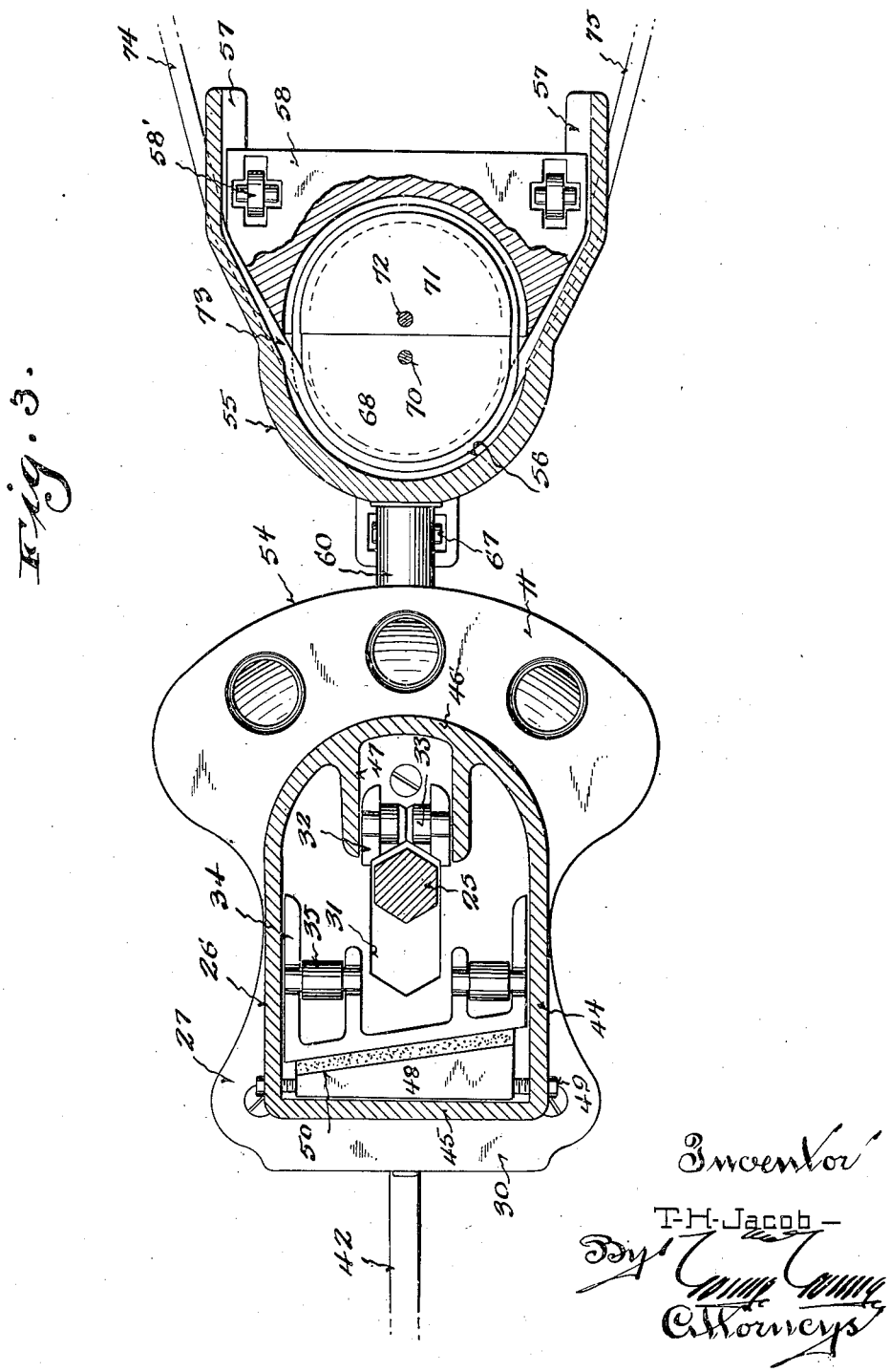

Patented Jan. 12, 1937

2,067,451

UNITED STATES PATENT OFFICE 2,067,451

COMBINED HITCH AND BRAKING DEVICE FOR TRAILERS

Thomas H. Jacob, Wausau, Wis.

Application February 20, 1935, Serial No. 7,398

6 Claims. (Cl. 188—112)

This invention appertains to vehicle couplers, and more particularly to a combined hitch and braking device for trailers.

With the increase of vehicular speed, the necessity of brakes on trailers is becoming more and more apparent. In some States laws have been passed making it compulsory to equip all trailers with brakes. It has been proposed to apply various types of brakes on trailers, such as compressed air brakes, vacuum brakes, hydraulic brakes, and so forth. All of these brake equipments are expensive, besides necessitating manual actuation, and a connection, or connections, between the trailer and drawing vehicle, resulting in difficulty in hitching. If the operator fails to couple the brake parts, or to correctly couple the parts, brake failure is bound to result. It is therefore one of the salient objects of my invention to provide a novel brake for motor vehicle trailers, which will effectively function under all desired conditions, and which does not require a special connection between the drawing and the trailing vehicles, and which will permit the drawing and trailing vehicles to be coupled together in the usual manner.

Another object of my invention is the provision of novel means for automatically applying the trailer brakes in time of need, and when the trailer tends to over-run the drawing vehicle, or to surge forwardly, whereby the necessity of the operator of the drawing vehicle actuating extraneous levers, buttons, etc., for the application of the brakes of the trailing vehicle, is eliminated.

Obviously, the only time brake application on a trailer is needed is when the trailer surges forwardly, or tends to over-run the drawing vehicle. This forward surge, itself, is energy, which is not only wasted, but in time of emergency is dangerous. This energy I term "surge" energy, and it is an important object of my invention to use this "surge" energy to automatically apply the trailer brakes.

A further object of my invention is to provide a coupling or hitch between the drawing and trailing vehicles, in which relative longitudinal movement between the two vehicles is normally prevented, whereby the trailing vehicle can be effectively drawn, and made to track behind the drawing vehicle, with means for permitting forward surge or longitudinal movement between the drawing and trailing vehicles, when the brakes of the drawing vehicle are applied, whereby said forward surge of the trailing vehicle can be utilized for applying the trailer brakes.

A further important object of my invention is the provision of a hitch for drawing and trailing vehicles, which will effectively permit the swinging of the coupling parts both in a vertical and horizontal plane, whereby the trailing vehicle can effectively track behind the drawing vehicle at all times, with novel means for insuring the application of the trailer brakes, irrespective of the angular position of the coupled parts relative to one another.

A further object of my invention is the provision of a novel sliding connection between the trailer tongue and the drawing vehicle draw bar with a latch normally preventing sliding movement of the connected parts, and with means for operating the latch from the ordinary brakes of the drawing vehicle, whereby to permit the sliding movement between the connected parts upon the application of the brakes of the drawing vehicle.

A further object of my invention is the provision of an operating plunger carried by the trailer tongue for actuating the brakes of the trailer, with novel means carried by the draw bar of the drawing vehicle for actuating said plunger upon sliding movement of the connected parts, and upon forward surge of the trailer.

A further object of my invention is the provision of a novel equalizing device disposed between the operating plunger and the wheel brakes of the trailer, so that equal application of the brakes on the trailer wheels is insured.

A further object of my invention is the provision of novel means for forming the entire hitch, whereby the same can be economically made, and without accurate machine-work, novel means being provided for adjusting and setting the various parts, and for taking up wear incident to constant use.

A still further object of my invention is to provide novel means for manually actuating the equalizing device on the trailer, whereby the brakes on the trailer can be applied when the trailer is uncoupled from the drawing vehicle, and when the trailer is stopped on an incline.

With these and other objects in view, the invention consists in the novel construction, arrangement, and formation of parts, as will be hereinafter more specifically described, claimed, and illustrated in the accompanying drawings, in which drawings:—

Figure 1 is a side elevation of my improved hitch, showing the same in use on a drawing vehicle and a trailing vehicle, only parts of the vehicles being illustrated.

Figure 2 is an enlarged fragmentary side elevation of my improved hitch, showing the important parts thereof, and showing the hitch in its coupled condition, parts of the view being shown broken away and in longitudinal section.

Figure 3 is a horizontal section, taken on the line 3—3 of Figure 2, looking in the direction of the arrows.

Figure 4 is a fragmentary horizontal, sectional view taken substantially on the line 4—4 of Figure 2, looking in the direction of the arrows, illustrating the manual means employed for actuating the trailer brakes.

Figure 5 is a detailed transverse section, taken substantially on the line 5—5 of Figure 2, looking in the direction of the arrows, illustrating parts of the brake-equalizing device, and means for manually applying the brake.

Figure 6 is a detailed vertical section, taken substantially on the line 6—6 of Figure 2, looking in the direction of the arrows, illustrating the sliding connection between the trailer tongue and the vehicle draw bar.

Referring to the drawings in detail, wherein similar reference characters designate corresponding parts throughout the several views, the letter H generally indicates my combined trailer hitch and brake, and the same embodies a tongue 10 carried by the trailer T. The construction of the tongue 10 can be varied to accord with the type of trailer T with which the same is associated, and any desired means can be employed for firmly anchoring the tongue to the trailer.

For the purpose of illustration, the trailer T is shown to include side channel beams 11, supporting a transverse dead axle 12, on which are rotatably mounted the ground wheels 13. These ground wheels 13 are provided with brakes 14 of expanding type, the brake bands of which are expanded by means of a swinging lever 15. The specific construction of the trailer and its wheel brakes forms no part of my present invention, but parts of my novel device extend to and operate the levers 15 of the brakes.

The trailer tongue 10 carries the socket 16 for engaging the ball head 17. This ball head 17, in ordinary practice, is rigidly secured to a preferred part of the drawing vehicle, and the construction of the ball and socket can be of the type shown in my prior patents Nos. 1,927,591, and 1,977,065, issued to me September 19, 1933, and October 16, 1934, respectively.

The specific construction of the ball and socket will therefore not be described in detail, but it will be noted that the hinged parts of the socket are retained in their closed position by a sliding sleeve 18 mounted on the tongue 10.

In accordance with the present invention I mount the ball 17 in a novel manner on the drawing vehicle D. The drawing vehicle can be of any character or type, such as a pleasure car or truck. As shown, the same includes the usual chassis 19, having the rear live axle 20 suspended by springs 21 from the frame. This drawing vehicle D is provided with any preferred type of brakes, and, as shown, the same is provided with a brake foot pedal 22, rockably mounted on a suitable cross shaft 23. Mounted for movement with the brake pedal or lever 22 is an operating crank arm 24, to which is connected certain parts of my device, as will be later set forth.

Rigidly secured to and depending from the ball 17 is the stem 25 of the ball, and this stem is preferably of hardened steel, and is of a polygonal shape in cross section. The ball and its stem are rigidly connected to a cover plate or casting 26 slidably mounted on the top face of a bottom casting 27. This bottom casting 27 is firmly anchored to the drawing vehicle, and the specific means employed forms the subject matter of a separate application for patent Serial No. 7,397, filed February 20, 1935. In the present application it is to be understood that the bottom casting 27 can be rigidly secured to the drawing vehicle in any preferred manner, and for the purpose of illustration the same is connected by means of bolts 28 with draw bars 29, which are bolted or otherwise secured to the desired part of the vehicle D. The bottom casting 27 and top casting 26 form an important part of the present invention, and hence said parts will now be described in detail.

The bottom casting 27 includes a flat top plate 30 having a longitudinally extending slot 31, through which extends the stem 25 of the ball 17. The slot 31, and the stem 25, are preferably of such a nature that the stem will be held against lateral shifting movement, but will be permitted free longitudinal sliding movement. The plate 30 and the entire casting 27 can be reenforced in any preferred or approved manner, and, as shown, the top face of the plate 30 has formed thereon, directly in advance of the slot 31, upstanding spaced ears 32, which rotatably support an anti-friction roller 33. In advance of the slot 31, and on opposite sides thereof, the plate 30 is provided with pairs of ears 34, which rotatably support anti-friction rollers 35. The forward ends of the pairs of ears 34 are all connected by a diagonally extending lip or abutment 36. The lower surface of the plate, in advance of the slot 31, is provided with a pair of pivot ears 37, which supports for rocking movement the bell crank shaped latch dog 38. This latch dog 38 is pivoted at its angle to the ears 37, and embodies the angularly extending arms 39 and 40. The arm 39 constitutes the latching part, and extends forwardly of the plate, being normally held in firm contact with the stem 25 of the ball by means of a relatively heavy spring 41. Thus the dog functions to normally hold the stem 25, and consequently its casting 26 and the tongue 10, against sliding movement relative to the drawing vehicle and the bottom casting 27. The depending arm 40 of the latch has connected thereto an eye 41', and the eye 41' is connected by means of a cable 42, with the crank 24 of the foot brake pedal or lever 22.

From the construction so far, it can be seen that when the brake pedal or lever 22 is depressed to apply the brakes of the vehicle D, the latch dog 40 will be actuated to move its latch arm 39 from out of path of the stem 25, so that sliding movement of the stem can be had. The eye 41' is preferably resiliently connected with the latch dog 38 for the purpose of taking up wear between various parts, and for taking up slack in the cable 42.

Referring specially to the top cover plate or casting 26, it is to be noted that the same is of a smaller size than the bottom casting, and includes a top plate or wall 43, depending side walls 44, and a front and back wall 45 and 46, the walls 44, 45, and 46 being in the nature of depending flanges. Formed on the inner surfaces of the top wall 43 are depending spaced, parallel, guide ribs 47, which lie on opposite sides of the ears 32 on the bottom plate. The antifriction rollers 33 and 35 engage and support the top casting or cover plate 26, so as to facilitate the movement of said top plate or casting when the latch 38 is actuated.

To permit initial adjustment to be had between the two castings, a wedge block 48 is mounted within the casting 26, and this wedge block confronts the diagonal wall 36 of the bottom casting. The wedge block 48 can be shifted laterally, or transversely, of the casting 26 by means of set screws 49, and obviously by shifting the wedge block a limited longitudinal movement between the castings 26 and 27 will be had. A shock-absorbing pad 50 can be arranged between the confronting faces of the inclined or diagonal wall 36, and the wedge 48. This pad 50 takes up shock and decreases noise when the trailing vehicle T pulls backwardly.

The stem 25 of the ball 17 supports below the plate 30 of the casting 27 a shaft 51, and the terminals of the shaft 51, having rotatably mounted thereon the rollers 52, which engage the lower surface of the plate 30. This holds the parts in assembled position, and prevents accidental separation thereof. The shaft 51 is eccentrically mounted within the stem 25, so that the shaft can be turned to raise and lower the rollers 52 relative to the plate 30. This permits initial adjustment to be had between the castings, and when the desired adjustment is reached the shaft is held against turning movement by the use of a set screw or the like 53. Obviously, as wear takes place, the shaft can be readjusted so as to eliminate all loose play.

Formed upon the rear of the plate 30 of the casting 27 is my novel radial push plate 54. This push plate 54 depends from the top plate 30, and is curved both longitudinally and transversely, for a purpose which will be later set forth, and the curvature of this plate will also be later described more in detail. The top face of the plate 30 adjacent to its rear end can be slightly raised and bevelled, as at 30', so that a binding action will take place between the castings 26 and 27, when the casting 26 tends to ride too far back on the plate 30.

Rigidly bolted to the trailer T, below the tongue 10, is the trailer casting 55. This trailer casting includes a housing 56, and guide tracks 57, in which is slidably mounted the slide block 58. The slide block 58 forms a part of my novel brake equalizer, and it is to be noted that this block carries a depending ear 59 to which is rigidly secured the operating plunger 60. The operating plunger 50 extends forwardly of the ear 59 through a guide sleeve 61 cast on the housing 56. The extreme forward end of the plunger is provided with a curved face 62 for engagement with a curved radial push plate 54.

In order to maintain the face 62 in proper confronting relation to the curved radial push plate 54, the shank of the plunger 60 is flattened on one side, as at 63, and the opening in the ear 59, through which the shank extends, conforms to the shape of the shank, whereby turning movement of the shank in the ear is precluded. The shank is provided with threads of the desired pitch, and nuts 64 and 65 are threaded on said shank in contact with the ear 59. Obviously, by loosening and tightening the nuts, the shank can be initially adjusted longitudinally of its casting to obtain the desired set for the plunger.

A relatively heavy expansion spring 66 is coiled about the shank of the plunger, and is confined between one end wall of the guide sleeve for the plunger and an annular shoulder formed on said plunger. Thus the spring 66 normally functions to urge the plunger 60, and the slide block 58, forwardly of the casting 55. An anti-friction roller 67 can be carried by the front of the guide sleeve 61 for engaging the lower face of the plunger, to facilitate the supporting of the front end thereof, and to facilitate the plunger sliding movement. The sliding plate 58 can also carry anti-friction rollers 58' for engagement with the walls of the casting 55, so as to allow free sliding movement of the block in its guides or tracks.

Referring more specifically to the brake equalizer, it can be seen that I mount within the housing 56, on the casting 55, a pair of superimposed sheaves 68 and 69. For the purpose of conserving space these sheaves can be of a sector shape, and are mounted for swinging movement on a vertical shaft 70, which can be in the nature of a rivet, if so preferred.

A relatively broad sheave 71 is carried by the slide block 58, and this sheave 71 is also of a sector shape, and the sheave is rockably mounted on a vertical shaft 72, which can also be in the nature of a rivet, if so preferred.

The flat faces of the sheaves 68, 69, and 71 are arranged in confronting relation, and when the slide block 58 is in its normal forward position, rotation of the sheaves are prevented by the engagement of said flat faces. A brake-equalizing cable 73 is trained initially over the sheave 69, and then about the sheave 71, and then about the sheave 68. The reaches 74 and 75 of the cable extend rearwardly from the casting 55, and are firmly secured to the levers 15 of the wheel brakes 14.

From the description of the brake equalizer it will be noted that the intermediate portion of the brake cable 73 is trained over the central sheave 71, which is carried by the slide block 58.

When the slide block 58 is forced rearwardly by means which will be later set forth, a pull is exerted on the intermediate portion of the cable, which movement is transmitted to the cable reaches 74 and 75, which brings about the application of the brakes. During movement of the cable, the sheaves turn on their pivots or shafts, and when the slide block returns to its normal position, the flat faces of the sheaves engage, which insures proper return of the sheaves to their correct position.

Considering that the trailer T has been connected to the drawing vehicle D by means of the two-part socket 16, the plunger 60 will engage the curved radial plate 54, and the parts will be properly disposed for operation. It is to be understood, of course, that the plunger 60, and the other parts of the device, have been initially adjusted to their proper positions.

Upon the starting of the drawing vehicle, the trailer T will be drawn therewith, and relative sliding movement between the trailer T and the drawing vehicle D will be prevented by the latch 38. Thus all forward surge of the trailer will be prevented, and the trailer will effectively track behind the drawing vehicle. Should it become necessary to apply the brakes of the drawing vehicle, the pedal or brake lever 22 will be depressed, which will withdraw the latch arm 39 from out of the path of the stem 25 of the ball 17, through the medium of the cable connection 42. As the speed of the drawing vehicle slackens, the trailer T will have a tendency to over-run the drawing vehicle, or surge forwardly, and hence the ball 17, with its stem 25 and casting 26, will slide forwardly on the bottom casting 27.

The curved radial plate 54 will push back on the plunger 60, and this movement will be transmitted to the slide block 58, and the brake-equalizing parts, and apply the brakes 14 to the wheels 13 of the trailer through the cable reaches or runs 73 and 74. When pressure is released on the brake pedal or lever 22, and the drawing vehicle D again starts forwardly, the backward pull of the trailer T will slide the stem 25 in its slot 31. As the latch dog 38 has been released by the slack in the cable 42, its spring 41 will again move the latch arm 39 in the path of the stem 25, and hold the stem against further sliding movement. Rearward movement of the trailer T will allow forward sliding movement of the plunger 60 under influence of its spring 66, and consequently the brakes of the trailer will be instantly released.

It therefore can be seen that novel means has been provided for automatically applying the brakes of a trailing vehicle upon the application of the brakes of the drawing vehicle, and upon forward surge of the trailer relative to the drawing vehicle. The plunger 60 will be operated irrespective of whether the trailer is going around a curve, or up or down an incline, in view of the fact that the radial push plate 54 is curved both vertically and horizontally. Thus the plunger 60, with its curved face 62, can slide around the push plate 54, and up and down the push plate, and still be actuated upon forward sliding movement of the stem 25. The arc on which the curvature of the radial push plate is struck has its center slightly in rear of the normal position of the axial center of the ball 17, so that should the plunger 60 be disposed at the side of the push plate 54 upon brake application, sufficient movement will be imparted to the plunger to insure the correct application of the brakes.

I also have provided novel means for manually applying the brakes of the trailer when the trailer is on an incline, and when the trailer is uncoupled from the drawing vehicle. This means includes a sliding rack bar 76 mounted within the housing 56. This rack bar 76 abuts against a shoulder 77 formed on the slide block 58. Meshing with the rack teeth 78 of the rack bar 76 are the teeth 79 of the sector shaped head 80 of the operating lever 81. This lever 81 is rockably mounted on a supporting pivot pin 82, and obviously, upon movement of the lever, the rack bar 76 can be moved front or back. Backward movement of the rack bar 78 will cause the rear sliding of the slide block 58, and the consequent application of the wheel brakes of the trailer. The rack bar 76 can also be provided with ratchet teeth 83, which are adapted to be engaged by a spring-pressed pawl 84 for holding the rack bar in preferred adjusted position. Obviously, upon manual release of the pawl 84, from out of engagement with the ratchet teeth 83, the spring 66 of the plunger 60 will return the rack bar and the slide bar to their normal positions.

Changes in details may be made without departing from the spirit or scope of this invention, but what I claim as new is:—

1. The combination with a trailing vehicle having wheel brakes, and a drawing vehicle, of a hitch for connecting said vehicles together including a plate rigidly connected with the drawing vehicle, a tongue for the trailer, a slide plate mounted on the first plate, a ball and socket hitch connection between the tongue and slide plate, a spring-pressed plunger on the trailer, means for operating the wheel brakes of the trailer from the plunger, a curved push plate on the first-mentioned plate, the plunger being normally urged into engagement with said curved push plate and adapted to follow the contour thereof incident to the swinging movement of the tongue on the slide plate, said plunger being movable to apply the wheel brakes upon forward sliding movement of the slide plate on said first plate.

2. The combination with a trailing vehicle having wheel brakes, and a drawing vehicle, of a hitch for connecting said vehicles together including a plate rigidly connected with the drawing vehicle, a tongue for the trailer, a slide plate mounted on the first plate, a ball and socket hitch connection between the tongue and slide plate, a spring-pressed plunger on the trailer, means for operating the wheel brakes of the trailer from the plunger, a curved push plate on the first-mentioned plate, the plunger being normally urged into engagement with said curved push plate and adapted to follow the contour thereof incident to the swinging movement of the tongue on the slide plate, said plunger being movable to apply the wheel brakes upon forward sliding movement of the slide plate on said first plate, and a releasable catch normally holding said first plate and said slide plate against movement.

3. The combination with a trailing vehicle having wheel brakes and a drawing vehicle, of a hitch connecting said vehicles together including an attaching plate rigidly connected with the drawing vehicle, a slide plate mounted on the attaching plate, a tongue for the trailer, a ball and socket connection between the tongue and slide plate, a push plate on the attaching plate curved both longitudinally and transversely, an operating plunger carried by the trailer, spring means normally urging the plunger toward the curved push plate, and means for actuating the wheel brakes of the trailer from the plunger including a brake-equalizing device.

4. The combination with a trailing vehicle having wheel brakes, and a drawing vehicle having a braking system including a brake lever, of a hitch for connecting said vehicles together including an attaching plate connected with the drawing vehicle, a slide plate mounted upon the attaching plate, a tongue carried by the trailer, a ball and socket connection between the slide plate and the tongue, a shank extending from the ball of the ball and socket connection through the attaching plate for sliding movement with the slide plate, a push plate on the attaching plate having a curved face, a slide plunger on the trailer, means operatively connecting the plunger with the wheel brakes, spring means normally urging the plunger toward the push plate, a spring-pressed latch on the attaching plate normally disposed in the path of the shank to prevent relative sliding movement of the slide plate and attaching plate, and means for operating the latch from the brake lever of the drawing vehicle.

5. The combination with a trailing vehicle having wheel brakes, and a drawing vehicle having a braking system including a brake lever, of a hitch for connecting said vehicles together including an attaching plate connected with the drawing vehicle, a slide plate mounted upon the attaching plate, a tongue carried by the trailer, a ball and socket connection between the slide plate and the tongue, a shank extending from the ball of the ball and socket connection through the attaching plate for sliding movement with the slide plate, a push plate on the attaching plate having a curved face, a slide plunger on the trailer, means operatively connecting the plunger with the wheel brakes, spring means normally urging the plunger toward the push plate, a spring-pressed latch on the attaching plate normally disposed in the path of the shank to prevent relative sliding movement of the slide plate and attaching plate, means for operating the latch from the brake lever of the drawing vehicle, and means for initially adjusting the position of the attaching and slide plates relative to one another.

6. The combination with a trailing vehicle having wheel brakes, and a drawing vehicle having a braking system including a brake lever, of a hitch for connecting said vehicles together including an attaching plate connected with the drawing vehicle, a slide plate mounted upon the attaching plate, a tongue carried by the trailer, a ball and socket connection between the slide plate and the tongue, a shank extending from the ball of the ball and socket connection through the attaching plate for sliding movement with the slide plate, a push plate on the attaching plate having a curved face, a slide plunger on the trailer, means operatively connecting the plunger with the wheel brakes, spring means normally urging the plunger toward the push plate, a spring-pressed latch on the attaching plate normally disposed in the path of the shank to prevent relative sliding movement of the slide plate and attaching plate, means for operating the latch from the brake lever of the drawing vehicle, and means for initially adjusting the position of the plunger relative to the push plate.

THOMAS H. JACOB.